United States Patent
Onishi (10) Patent No.: US 11,647,423 B2
(45) Date of Patent: May 9, 2023

(54) WIRELESS COMMUNICATION DEVICE, WIRELESS COMMUNICATION SYSTEM, AND WIRELESS COMMUNICATION METHOD

(71) Applicant: TOYOTA JIDOSHA KABUSHIKI KAISHA, Toyota (JP)

(72) Inventor: Ryokichi Onishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/468,790

(22) Filed: Sep. 8, 2021

(65) Prior Publication Data

US 2022/0086696 A1 Mar. 17, 2022

(30) Foreign Application Priority Data

Sep. 14, 2020 (JP) .............................. JP2020-154151

(51) Int. Cl.
| | |
|---|---|
| *H04W 28/20* | (2009.01) |
| *H04W 28/08* | (2023.01) |
| *H04L 45/12* | (2022.01) |
| *H04L 47/24* | (2022.01) |
| *H04W 72/566* | (2023.01) |

(52) U.S. Cl.
CPC ............ *H04W 28/20* (2013.01); *H04L 45/12* (2013.01); *H04L 47/24* (2013.01); *H04W 28/0967* (2020.05); *H04W 72/569* (2023.01)

(58) Field of Classification Search
CPC .... H04L 47/24; H04W 4/40; H04W 28/0967; H04W 28/20; H04W 48/18; H04W 72/1242
See application file for complete search history.

(56) References Cited

U.S. PATENT DOCUMENTS

| | | | |
|---|---|---|---|
| 2017/0257320 A1 | 9/2017 | Bolling et al. | |
| 2018/0159763 A1 | 6/2018 | Srinivasan et al. | |
| 2018/0220325 A1* | 8/2018 | Lee | ................ H04W 72/1242 |
| 2021/0258385 A1* | 8/2021 | Wang | ..................... H04L 47/24 |
| 2021/0274329 A1* | 9/2021 | Ying | ....................... H04W 4/40 |
| 2022/0210688 A1* | 6/2022 | Baglin | ............. H04W 28/0268 |

FOREIGN PATENT DOCUMENTS

JP 2018-120443 A 8/2018

* cited by examiner

*Primary Examiner* — Pao Sinkantarakorn
(74) *Attorney, Agent, or Firm* — Oliff PLC (57) ABSTRACT

A wireless communication device includes: a storage device that stores information indicating a correspondence between an identifier and a priority that are used in data transmission; and one or more processors configured to acquire data for transmission, identify the priority of the data for transmission acquired by the one or more processors, based on the identifier of the data for transmission and the information stored in the storage device, determine, based on the priority identified by the one or more processors, a wireless communication service to be used to transmit the data for transmission, among a plurality of wireless communication services that have different communication costs and different real-time performances of transmission, respectively, and transmit the data for transmission by using the wireless communication service that is determined.

13 Claims, 8 Drawing Sheets

5-tuple

| SOURCE IP | SOURCE Port | DESTINATION IP | DESTINATION Port | TCP\|UDP | APN |
|---|---|---|---|---|---|
| * | * | IP-A (x.x.x.x) | * | * | 1 |
| IP-B | * | * | * | * | 2 |
| IP-C | * | * | * | * | 2 |
| IP-D | * | * | * | * | NONE |
| : | : | : | : | : | : |

FIG. 3

| APN | PURPOSE OF USE | PRIORITY | DATA AMOUNT COUNTER | DESTINATION GW |
|---|---|---|---|---|
| 1 | VOICE-OPERATOR SERVICE (VoLTE) | HIGH | a | CENTER |
| 2 | SIM REWRITING | HIGH | b | Subscription Manager |
| 3 | IN-VEHICLE INTERNET SERVICE | HIGH | c | CENTER (INTERNET) |
| 4 | ORDINARY TELEMATICS | HIGH | d | CENTER |
| 5 | BULK DATA UPLOAD | LOW | e | CENTER |
| 6 | SUPPORT FOR LOCAL LAWS AND REGULATIONS | HIGH | f | DESIGNATED GW |
| 7 | DRIVING ASSISTANCE WITH CLOUD COMPUTING INTELLIGENCE | HIGH | g | NEAR EDGE |
| 8 | BULK DATA UPLOAD + NETWORK EDGE PROCESSING | LOW | h | NEAR EDGE |

WIRELESS COMMUNICATION DEVICE, WIRELESS COMMUNICATION SYSTEM, AND WIRELESS COMMUNICATION METHOD

CROSS-REFERENCE TO RELATED APPLICATION

This application claims priority to Japanese Patent Application No. 2020-154151 filed on Sep. 14, 2020, incorporated herein by reference in its entirety.

BACKGROUND

1. Technical Field

The disclosure relates to a wireless communication device, a wireless communication system, and a wireless communication method.

2. Description of Related Art

There has been known a system in which various services are provided by communication being performed between a vehicle and a center. Japanese Patent Application Publication No. 2018-120443 discloses a technology that renders a service by which a travel status of an own vehicle is notified to a center when abnormality occurs.

SUMMARY

As services provided to users increasingly diversify, there is a growing need for a reduction in communication cost while decreases in quality of the individual services are restrained.

The disclosure provides a wireless communication device, a wireless communication system, and a wireless communication method that can reduce communication cost while restraining a decrease in service quality.

A wireless communication device according to a first aspect of the disclosure includes: a storage device that stores information indicating a correspondence between an identifier and a priority that are used in data transmission; and one or more processors configured to acquire data for transmission, identify the priority of the data for transmission acquired by the one or more processors, based on the identifier of the data for transmission and the information stored in the storage device, determine, based on the priority identified by the one or more processors, a wireless communication service to be used to transmit the data for transmission, among a plurality of wireless communication services that have different communication costs and different real-time performances of transmission, respectively, and transmit the data for transmission by using the wireless communication service that is determined.

A wireless communication system according to a second aspect of the disclosure includes: a server; and a wireless communication device configured to perform communication with the server, the wireless communication device including a storage device that stores information indicating a correspondence between an identifier and a priority that are used in data transmission, and one or more processors configured to acquire data for transmission, identify the priority of the data for transmission acquired by the one or more processors, based on the identifier of the data for transmission and the information stored in the storage device, determine, based on the priority identified by the one or more processors, a wireless communication service to be used to transmit the data for transmission, among a plurality of wireless communication services that have different communication costs and different real-time performances of transmission, respectively, and transmit the data for transmission to the server by using the wireless communication service that is determined.

A wireless communication method according to a third aspect of the disclosure is a method for a wireless communication device including a storage device that stores information indicating a correspondence between an identifier and a priority that are used in data transmission. The wireless communication method includes: acquiring data for transmission; identifying a priority of the data for transmission that is acquired, based on an identifier of the data for transmission and the information stored in the storage device; determining, based on the priority that is identified, a wireless communication service to be used to transmit the data for transmission, among a plurality of wireless communication services that have different communication costs and different real-time performances of transmission, respectively; and transmitting the data for transmission by using the wireless communication service that is determined.

According to the disclosure, communication cost can be reduced while a decrease in service quality can be restrained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
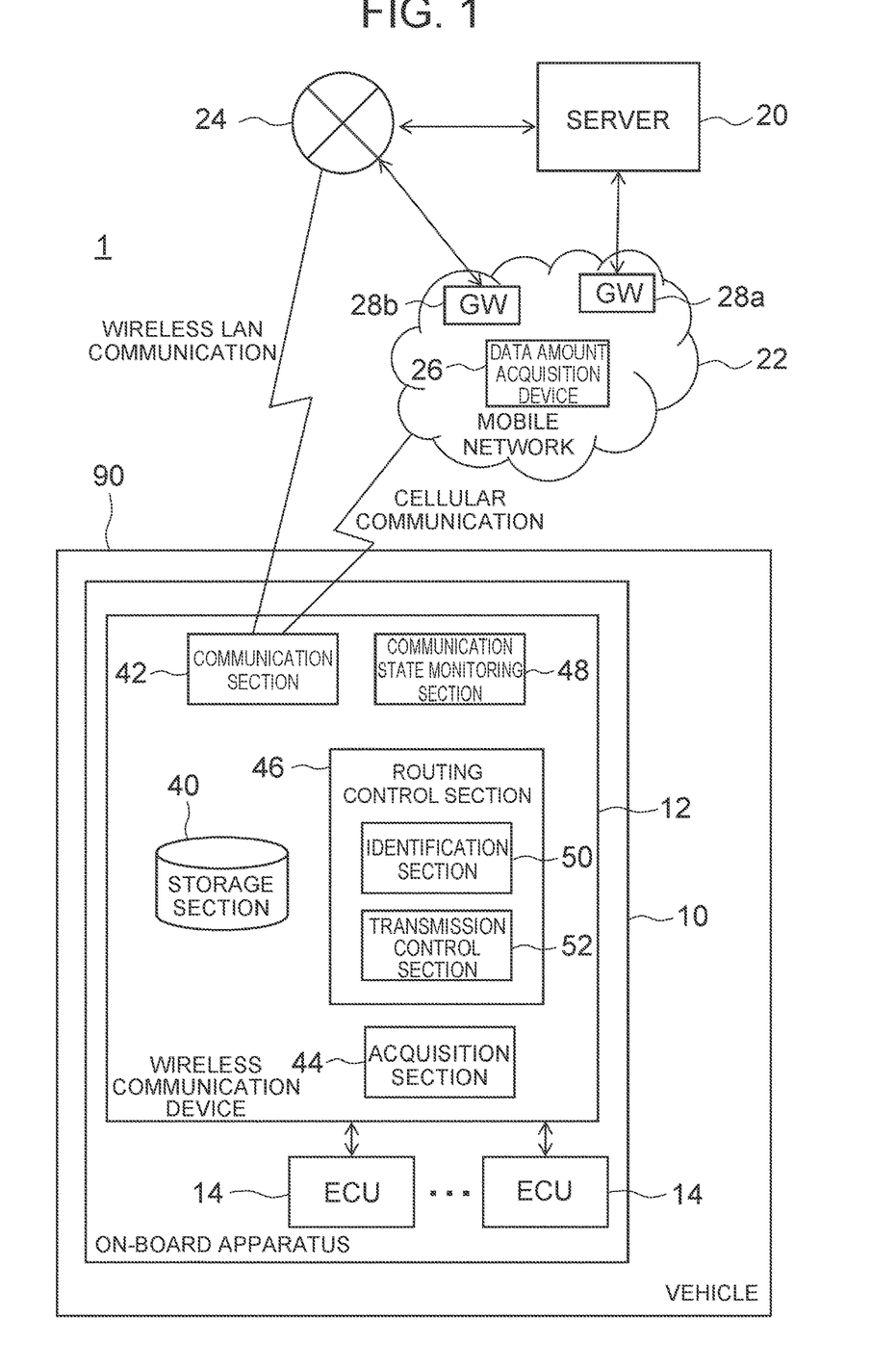
FIG. 1 shows a functional configuration of a wireless communication system in an embodiment.

FIG. 1 shows a functional configuration of a wireless communication system 1 in an embodiment. The wireless communication system 1 includes an on-board apparatus 10 and a server 20.

The on-board apparatus 10 is mounted in a vehicle 90 that is an automobile. The on-board apparatus 10 is mounted in each of a plurality of vehicles 90, and the wireless communication system 1 includes a plurality of the on-board apparatuses 10. However, FIG. 1 shows one on-board apparatus 10 of the plurality of on-board apparatuses 10.

The on-board apparatus 10 includes a wireless communication device 12 and a plurality of Electronic Control Units (ECUs) 14. The wireless communication device 12 is also referred to as a Data Communication Module (DCM) and is an on-board communication device having wireless communication functionality that supports a plurality of wireless communication services. The wireless communication device 12 can connect to a mobile network 22 via a wireless base station (not shown) through cellular communication such as 4G (fourth generation mobile communication system) or 5G (fifth generation mobile communication system). Hereinafter, as examples of the cellular communication, cellular Mobile Broadband (MBB) and cellular Background Data Transfer (BDT) in 5G are assumed. Cellular MBB is an example of a first wireless communication service, and cellular BDT is an example of a second wireless communication service. Cellular MBB is a general data communication scheme in 5G. Cellular BDT is a data communication scheme for 5G Internet of Things (IoT) devices standardized by Third Generation Partnership Project (3GPP).

The mobile network 22 is connected to the server 20 by a gateway 28a, and to a network 24 by a gateway 28b. The network 24 is, for example, the Internet.

The wireless communication device 12 can connect to the network 24 via a wireless access point (not shown) through wireless Local Area Network (LAN) communication such as Wi-Fi®. Wireless LAN is an example of a third wireless communication service. The network 24 is connected to the server 20.

The plurality of wireless communication services have different communication costs and different real-time performances of transmission, respectively. The communication costs become lower in the following order of cellular MBB, cellular BDT, wireless LAN. The real-time performances of transmission become poorer in the following order of cellular MBB, cellular BDT, wireless LAN. A real-time performance of transmission indicates a degree of how soon data can be transmitted after a request for data transmission.

An area where and a time period of day when cellular BDT is available are determined by the mobile network 22, depending on a circuit usage status and the like. The area where cellular BDT is available is smaller than an area where cellular MBB is available, and the time period of day when cellular BDT is available is limited. Accordingly, the real-time performance of cellular BDT is poorer than the real-time performance of cellular MBB.

It is conceivable that wireless access points of wireless LANs to which the wireless communication device 12 can connect are installed in, for example, a home garage of a driver, a predetermined public parking lot, an automobile dealer, a vehicle charging station, and the like. A wireless LAN has a smaller available area than cellular BDT, and accordingly has a poorer real-time performance than cellular BDT.

The wireless communication device 12 performs communication with the server 20 via the mobile network 22 through cellular communication, or via the network 24 through wireless LAN communication. The wireless communication device 12 transmits data for transmission by using any one of cellular MBB, cellular BDT, and wireless LAN, depending on a priority of the data. Accordingly, transmission can be performed with a real-time performance and a communication cost that are suitable for data for transmission.

For example, the server 20 may be installed in a center, and can also be referred to as a cloud server. The server 20 provides various services to a user of the vehicle 90 by collecting and processing various types of information transmitted from the wireless communication device 12 and also transmitting various types of information for provision to the wireless communication device 12.

The plurality of ECUs 14 include various types of ECUs, such as a car navigation ECU, a power supply control ECU, and an automatic driving ECU. Each ECU 14 outputs, to the wireless communication device 12, data to be transmitted to the server 20 or the like. Each ECU 14 receives, from the wireless communication device 12, data received by the wireless communication device 12 from the server 20 or the like.

The wireless communication device 12 includes a storage section 40, a communication section 42, an acquisition section 44, a routing control section 46, and a communication state monitoring section 48.

A configuration of the wireless communication device 12 can be implemented by using one or more arbitrary computer Central Processing Units (CPUs), one or more memories (including a volatile memory, a non-volatile memory), and one or more other Large Scale Integrations (LSIs) in terms of hardware, and can be implemented by using a program loaded on the memory or the like in terms of software. Here, functional blocks are illustrated that are implemented through cooperation of such hardware and software. Accordingly, it can be understood by persons skilled in the art that the functional blocks can be implemented in various forms by using only hardware or only software, or by combining hardware and software.

The communication section 42 performs cellular communication with a wireless base station on the mobile network 22, and performs wireless LAN communication with a wireless access point.

The storage section 40 stores a communication policy and can also be referred to as a communication policy management section. The server 20 transmits the communication policy beforehand to the wireless communication device 12 of each of the plurality of vehicles 90 via the mobile network 22, and the storage section 40 stores the communication policy received by the communication section 42. When any change needs to be made in the communication policy, the server 20 changes the communication policy and transmits the changed communication policy to the plurality of wireless communication devices 12, whereby the communication policy in the plurality of wireless communication devices 12 can be changed collectively.

The communication policy includes information on a correspondence between a connection and an Access Point Name (APN) and information on settings of an APN.

Figure 2:
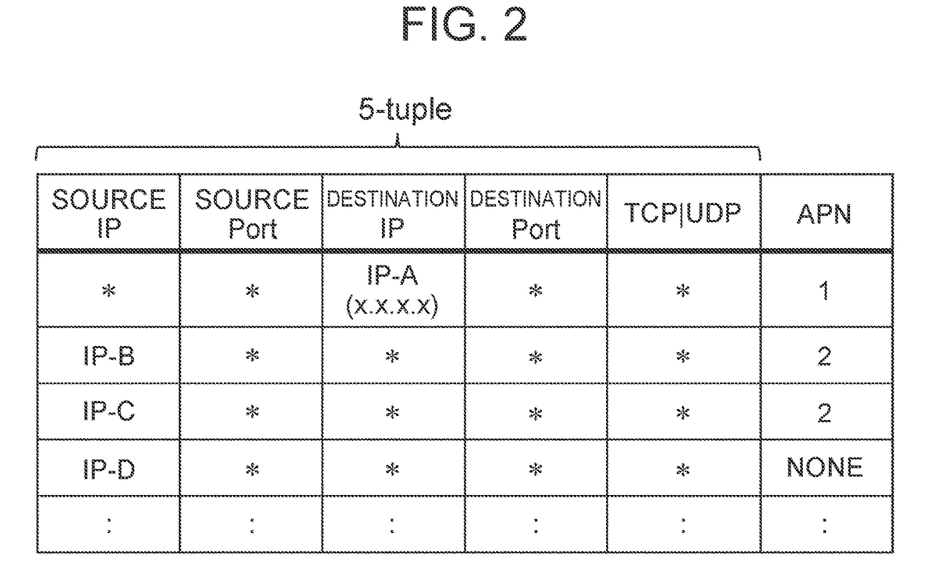
FIG. 2 shows an example of connection-APN correspondence information stored in a storage section in FIG. 1.

FIG. 2 shows an example of the connection-APN correspondence information stored in the storage section 40 in FIG. 1. As shown in FIG. 2, the connection-APN correspondence information indicates a correspondence between 5-tuple information on a connection and an APN.

The 5-tuple information is included in a header of a packet of data output from an ECU 14, and includes a source IP address, a source port number, a destination IP address, a destination port number, and a protocol type that is TCP or UDP. The 5-tuple information can also be referred to as an identifier used in data transmission. The source IP address corresponds to an IP address of an ECU 14 that is a data source. The source port number corresponds to a type of an application of the data source. The destination IP address corresponds to an IP address of a server that is a data destination. The destination port number corresponds to a type of an application of the data destination.

The sign "*" in FIG. 2 represents a wild card. In the connection-APN correspondence information, a wild card can be used for one or some, or all, of specific items of the 5-tuple information.

In the example in FIG. 2, an APN "1" handles a connection having a destination IP address "IP-A", regardless of the other items of the 5-tuple information. An APN "2" handles a connection having a source IP address "IP-B", regardless of the other items of the 5-tuple information. An APN "NONE" handles a connection having a source IP address "IP-D", regardless of the other items of the 5-tuple information.

Figure 3:
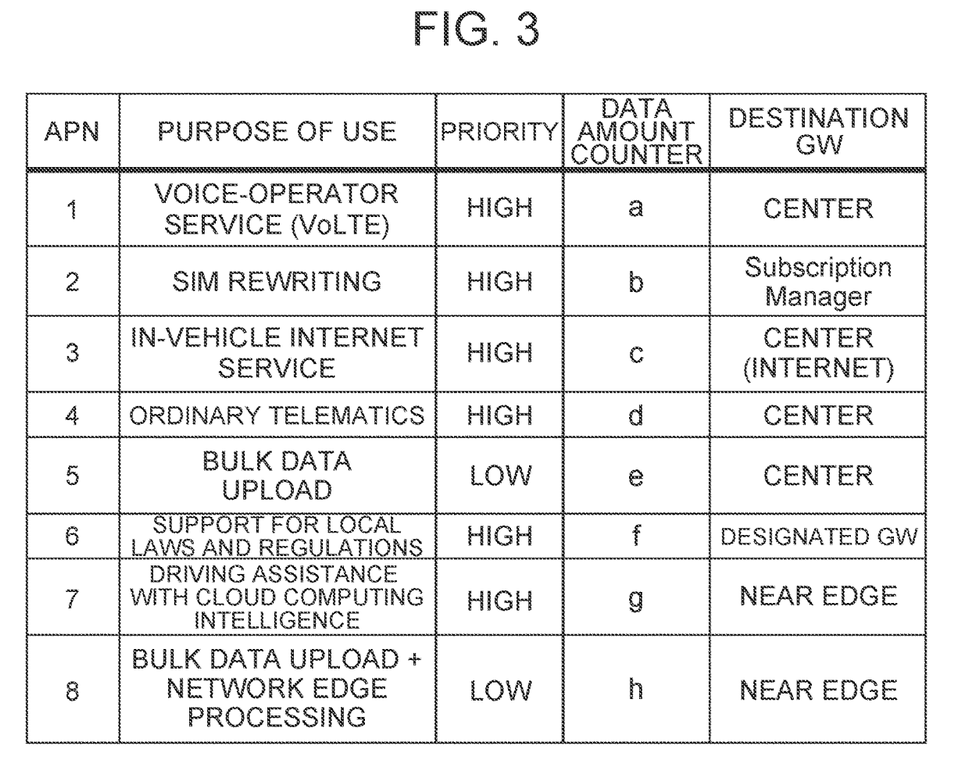
FIG. 3 shows an example of APN settings information stored in the storage section in FIG. 1.

FIG. 3 shows an example of the APN settings information stored in the storage section 40 in FIG. 1. As shown in FIG. 3, the APN settings information includes a purpose of use, a priority, data amount counter information, and a destination GateWay (GW), for each APN. The number of APNs is not limited to "8", and may be smaller or larger than "8".

The data amount counter information varies from APN to APN, and is used for a data amount acquisition device 26 on the mobile network 22, which will be described later, to count an amount of data communicated at each APN.

The destination GW is information for specifying a gateway on the mobile network 22. A destination GW can be specified for each APN.

For example, with respect to the APN "1", the purpose of use is "voice-operator service", the priority is "high", the data amount counter information is "a", and the destination GW is "center".

The "voice-operator service" is a service by which an occupant of the vehicle 90 can make voice conversation with an operator in an emergency or a breakdown, or when a need arises.

The "center" indicates the gateway 28a that is closest to the server 20 of the center. The gateway 28a and the server 20 are directly connected through a dedicated line, not via the network 24 that is the Internet. Thus, the length of the dedicated line can be shortened, and a reduction in cost of the wireless communication system 1 can be achieved. It is also possible to avoid the gateway 28b to the Internet that is congested.

With respect to the APN "2", the purpose of use is "SIM rewriting", the priority is "high", the data amount counter information is "b", and the destination GW is "Subscription Manager".

The "SIM rewriting" is a service by which information registered on a communication Subscriber Identity Module (SIM) card (not shown) installed in the wireless communication device 12 is rewritten. The "Subscription Manager" indicates a gateway (not shown) that is closest to a server (not shown) that performs rewriting of the SIM card.

With respect to an APN "3", the purpose of use is "in-vehicle Internet service", the priority is "high", the data amount counter information is "c", and the destination GW is "center (Internet)".

The "center (Internet)" indicates that the "Internet" may be specified instead of the "center". The "Internet" indicates the gateway 28b to the Internet.

With respect to an APN "4", the purpose of use is "ordinary telematics", the priority is "high", the data amount counter information is "d", and the destination GW is "center".

The "ordinary telematics" is telematic services other than the voice conversation with an operator and includes, for example, a service by which eco-driving records of the vehicle 90 are transmitted to the server 20, and the server 20 aggregates the records and provides a result of the aggregation to the driver.

With respect to an APN "5", the purpose of use is "bulk data upload", the priority is "low", the data amount counter information is "e", and the destination GW is "center".

The "bulk data upload" includes a service by which information such as a speed, a position, and a state of an in-vehicle device acquired by various sensors of the vehicle 90 is transmitted to the server 20, and the server 20 processes the information and provides various types of information based on a result of the processing to the driver.

With respect to an APN "6", the purpose of use is "support for local laws and regulations", the priority is "high", the data amount counter information is "f", and the destination GW is "designated GW".

The "support for local laws and regulations" includes, for example, a service by which position information and the like are transmitted to a predetermined server (not shown) when an accident or the like occurs in a predetermined country or region. The "designated GW" is a predetermined gateway (not shown) that is closest to the predetermined server.

With respect to an APN "7", the purpose of use is "driving assistance with cloud computing intelligence", the priority is "high", the data amount counter information is "g", and the destination GW is "near edge".

The "driving assistance with cloud computing intelligence" includes a service by which the information acquired by the various sensors of the vehicle 90 is transmitted to an edge server (not shown) existing near a position where the vehicle 90 travels, and the edge server derives driving assistance information based on the received information and provides the driving assistance information to the driver.

The "near edge" indicates not a gateway that is close to a specific server, but a gateway (not shown) that is close to the edge server.

With respect to an APN "8", the purpose of use is "bulk data upload+network edge processing", the priority is "low", the data amount counter information is "h", and the destination GW is "near edge".

The "bulk data upload+network edge processing" includes a service by which the information acquired by the various sensors of the vehicle 90 is transmitted to an edge server, and the edge server processes the information and provides various types of information based on a result of the processing to the driver.

The APN settings information and the connection-APN correspondence information are examples of information indicating a correspondence between an identifier and a priority.

The mobile network 22 also retains the APN settings information transmitted from the server 20. The mobile network 22 sets a gateway for a connection, based on an APN for the connection set by the wireless communication device 12, and on the retained APN settings information.

The description refers back to FIG. 1. The communication state monitoring section 48 monitors, via the communication section 42, an unused state of the mobile network, that is, availability of cellular BDT and a connection state of a wireless LAN, and outputs information on the states to the routing control section 46. A method of monitoring the availability of cellular BDT will be described later. For monitoring of the connection state of a wireless LAN, a publicly known technique can be used.

The acquisition section 44 acquires a packet of data for transmission output from an ECU 14, and outputs the acquired packet to the routing control section 46.

The routing control section 46 performs routing control of wireless communication, based on the 5-tuple information on the data for transmission provided from the acquisition section 44, the communication policy stored in the storage section 40, and the information provided from the communication state monitoring section 48. The routing control section 46 includes an identification section 50 and a transmission control section 52.

The identification section 50 acquires the communication policy from the storage section 40 and sets an APN for the data for transmission, based on the connection-APN correspondence information included in the communication policy, and on the 5-tuple information on the data for transmission provided from the acquisition section 44. The identification section 50 sets an APN that corresponds to the 5-tuple information on the data for transmission in the connection-APN correspondence information.

In the example in FIG. 2, the identification section 50 sets the APN "1", for data with a destination IP address of "IP-A", and sets the APN "2", for data with source IP addresses of "IP-B" and "IP-C". The identification section 50 sets the APN "none", for data with a source IP address of "IP-D". The APN "none" indicates that no APN is set. Data for which the APN "none" is set is data that is desired to be transmitted by using only wireless LAN, without using cellular communication.

An example of the data desired to be transmitted by using only wireless LAN is a type of data that is collected also from other vehicles and need not be transmitted soon, and is data for map creation or the like. The data for map creation is, for example, three-dimensional point group data measured by using a laser scanner (not shown) mounted on the vehicle 90, or the like. The server 20 collects such data from a plurality of vehicles 90 and creates map data.

The identification section 50 identifies a priority of the data for transmission, based on the APN set for the data for transmission, and on the APN settings information included in the communication policy. The identification section 50 identifies a priority corresponding to the APN set for the data for transmission, in the APN settings information. In the example in FIG. 3, the priority is identified as "high" when the set APN is any one of "1" to "4", "6", and "7", and the priority is identified as "low" when the set APN is "5" or "8". When the APN "none" is set, the identification section 50 identifies that the acquired data has no priority.

Such processing is an example of a processing "identify a priority of the data for transmission acquired by the acquisition section 44, based on an identifier of the data for transmission and the information stored in the storage section 40" by the identification section 50.

The transmission control section 52 controls transmission of the data by the communication section 42. The transmission control section 52 determines a wireless communication service to be used to transmit the data for transmission, among the plurality of wireless communication services, that is, cellular MBB, cellular BDT, and wireless LAN, based on the priority identified by the identification section 50. The transmission control section 52 transmits the data for transmission via the communication section 42, by using the determined wireless communication service.

Figure 4:
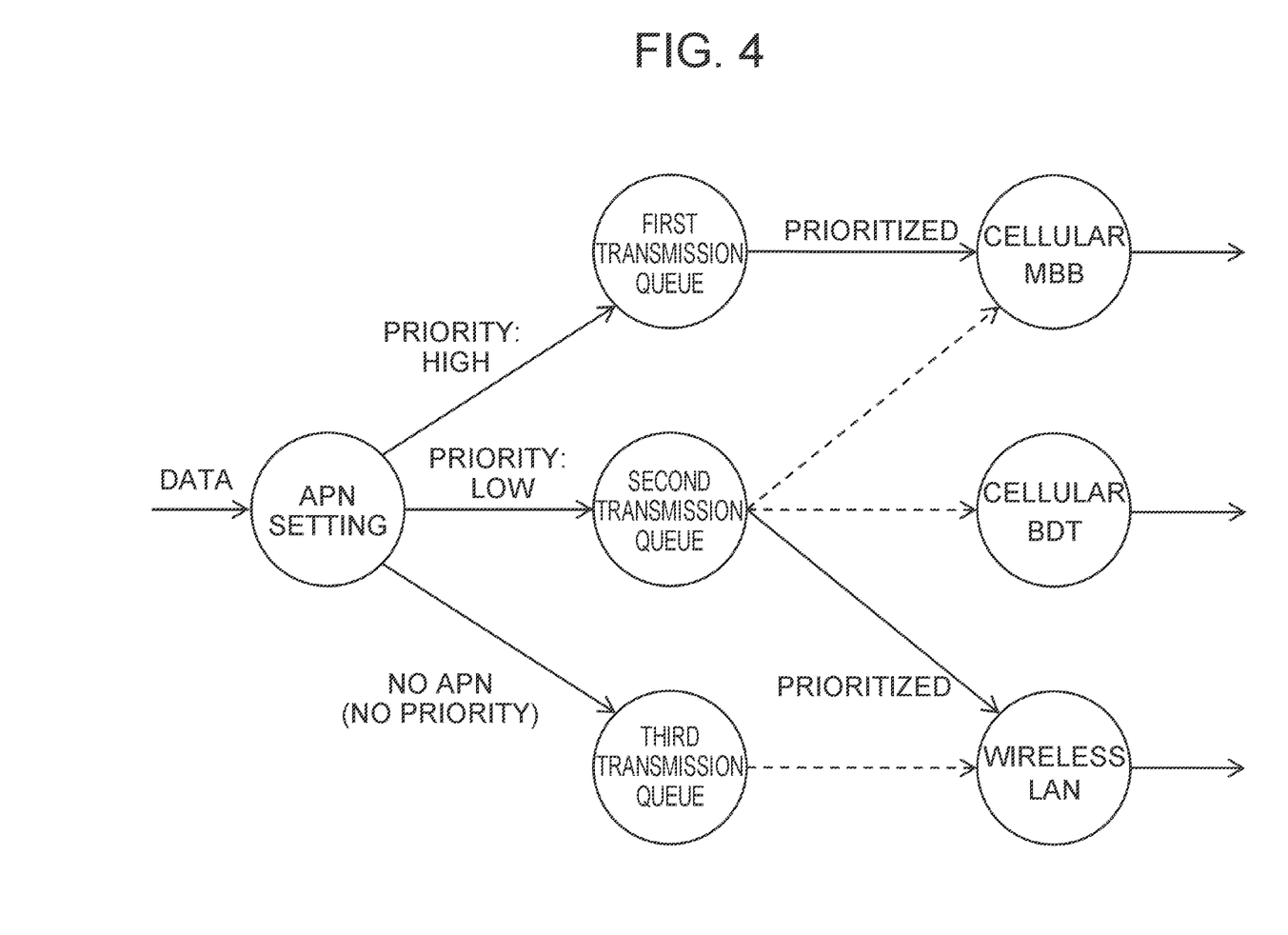
FIG. 4 is a diagram for describing routing control performed by a wireless communication device in FIG. 1.

FIG. 4 is a diagram for describing routing control performed by the wireless communication device 12 in FIG. 1. FIG. 4 shows flows of the data for transmission acquired by the acquisition section 44.

The transmission control section 52 stores the data for which an APN is set in any one of a first transmission queue, a second transmission queue, and a third transmission queue, depending on a priority of the data. The transmission queues may be included in the transmission control section 52.

The first transmission queue is a transmission queue for data requiring real-time performance of transmission. The transmission control section 52 stores data with high priority in the first transmission queue and transmits the stored data in the first transmission queue via the communication section 42 by using cellular MBB if cellular MBB is available. In other words, the transmission control section 52 determines cellular MBB as the wireless communication service used to transmit data with high priority.

At the time, when data in the second transmission queue is being transmitted by using cellular MBB, the transmission control section 52 interrupts transmission of the data in the second transmission queue until transmission of the data in the first transmission queue is finished. In other words, transmission of the data in the first transmission queue is prioritized over transmission of the data in the second transmission queue, and is performed with higher real-time performance. As described earlier, data with high priority is, for example, data for "voice-operator service", "SIM rewriting", or the like, and a decrease in service quality can be restrained by transmitting such data by using cellular MBB that achieves higher real-time performance.

The transmission control section 52 does not use cellular BDT or wireless LAN to transmit the data in the first transmission queue. This is because with cellular BDT and wireless LAN, real-time performance is not guaranteed on the infrastructure side, as described already.

The second transmission queue is a transmission queue for data that requires lower real-time performance of transmission than data with high priority and is desired to be transmitted at as low cost as possible.

The transmission control section 52 stores data with low priority in the second transmission queue and transmits the stored data in the second transmission queue via the communication section 42 by using wireless LAN if a wireless LAN is available. In other words, in this case, the transmission control section 52 determines wireless LAN as the wireless communication service used to transmit data with low priority. At the time, when data in the third transmission queue is being transmitted by using wireless LAN, the transmission control section 52 interrupts transmission of the data in the third transmission queue until transmission of the data in the second transmission queue is finished. In other words, transmission of the data in the second transmission queue is prioritized over transmission of the data in the third transmission queue.

As mentioned earlier, data with low priority is, for example, data for "bulk data upload", and transmission of such data can wait to some extent. Accordingly, such data is transmitted by using wireless LAN, whereby communication cost can be reduced while a decrease in service quality can be restrained.

When no wireless LAN is available and a predetermined first condition is satisfied, the transmission control section 52 transmits the data in the second transmission queue via the communication section 42 by using cellular BDT if cellular BDT is available. In other words, in this case, the transmission control section 52 determines cellular BDT as the wireless communication service.

The first condition is that a duration for which no wireless LAN is available exceeds a predetermined first time period, or an amount of the data in the second transmission queue exceeds a predetermined first threshold value, and that data in the first transmission queue is not being transmitted by using cellular MBB. Although an example in which cellular MBB and cellular BDT cannot be used at the same time is described here, cellular MBB and cellular BDT may be used at the same time. In a case where cellular MBB and cellular BDT can be used at the same time, the first condition may include, or need not include, the condition that data in the first transmission queue is not being transmitted by using cellular MBB.

As described above, transmission is performed by using cellular BDT when there is a delay in the transmission, whereby a decrease in service quality can be restrained.

When no wireless LAN is available and a predetermined second condition is satisfied, the transmission control section 52 transmits the data in the second transmission queue via the communication section 42 by using cellular MBB if cellular MBB is available. In other words, in this case, the transmission control section 52 determines cellular MBB as the wireless communication service.

The second condition is that a duration for which neither wireless LAN nor cellular BDT is available exceeds a predetermined second time period, or an amount of the data in the second transmission queue exceeds a predetermined second threshold value, and that data in the first transmission queue is not being transmitted by using cellular MBB.

The first time period, the second time period, the first threshold value, and the second threshold value can be determined as appropriate based on testing or simulation. The first time period is shorter than the second time period. The first threshold value is smaller than the second threshold value. Thus, when no wireless LAN is available, cellular BDT, which involves a lower communication cost than cellular MBB, can be preferentially used for transmission of data with low priority, so that an increase in communication cost can be restrained. Moreover, when there is a further delay in the transmission, a decrease in service quality can be restrained by using cellular MBB for the transmission.

In cellular BDT, a possible scenario is also supposed in which a packet is suddenly dropped by the mobile network 22 during communication, for example, when a circuit is congested due to a concert held nearby or the like. Since responsibility of recovering a dropped packet lies with an application, a design enabling recovery may be required of the application.

The third transmission queue is a transmission queue for data that is desired to be transmitted by using only wireless LAN. The transmission control section 52 stores data for which no APN is set, that is, data with no priority in the third transmission queue, and transmits the stored data in the third transmission queue via the communication section 42 by using wireless LAN if data in the second transmission queue is not being transmitted by using wireless LAN and a wireless LAN is available. In other words, the transmission control section 52 determines wireless LAN as the wireless communication service used to transmit data for which no APN is set. Thus, communication cost can be reduced.

Since an area where wireless LAN is available is limited as described already, a state where the data in the third transmission queue cannot be transmitted may continue depending on a situation where the vehicle 90 is used, so that the third transmission queue may possibly be filled to capacity. When the third transmission queue is filled to capacity, the transmission control section 52 discards part of the data in the third transmission queue. Data to be discarded may be, for example, the oldest packet data, but is not particularly limited. The data in the third transmission queue is a type of data that can also be transmitted from other vehicles, and therefore may be discarded. Thus, a situation where the third transmission queue is filled to capacity can be handled.

The communication state monitoring section 48 acquires availability of cellular BDT, by using any one of three schemes, which will be described below.

First Scheme

Figure 5:
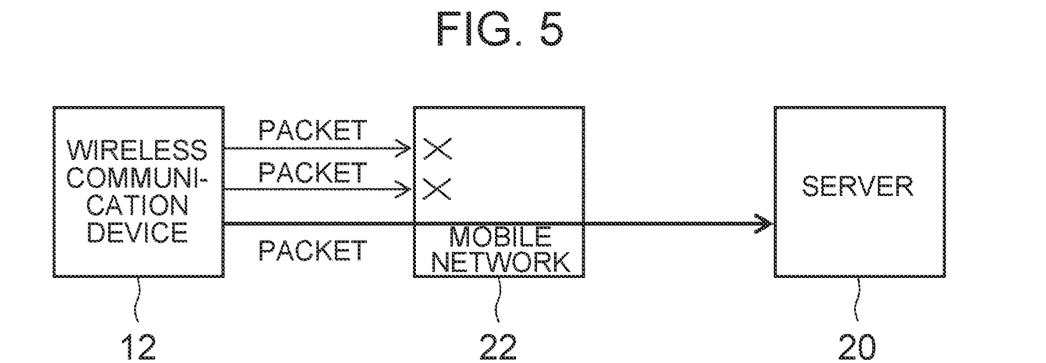
FIG. 5 is a diagram for describing a first scheme for acquiring availability of cellular BDT.

FIG. 5 is a diagram for describing a first scheme for acquiring availability of cellular BDT. In the first scheme, the wireless communication device 12 periodically performs a test. The communication state monitoring section 48 periodically measures a round-trip time of communication between the wireless communication device 12 and the center by using cellular BDT, and determines, based on a result of the measurement, whether or not cellular BDT is available. The communication state monitoring section 48 transmits a predetermined packet to the server 20 of the center by using cellular BDT, and determines that cellular BDT is available when the round-trip time, which is derived based on a packet returned from the server 20 in response to the predetermined packet, is equal to or shorter than a predetermined time period. When cellular BDT is unavailable, no packet is returned from the server 20.

In the example in FIG. 5, in first and second packet transmissions, a packet does not reach the server 20, and therefore no packet is returned. In a third packet transmission, a packet reaches the server 20, the round-trip time is equal to or shorter than the predetermined time period, and it is determined that cellular BDT is available.

The first scheme has an advantage that standardization is not required, and no implementation needs to be made on the mobile network 22 or in the server 20 of the center.

Second Scheme

Figure 6:
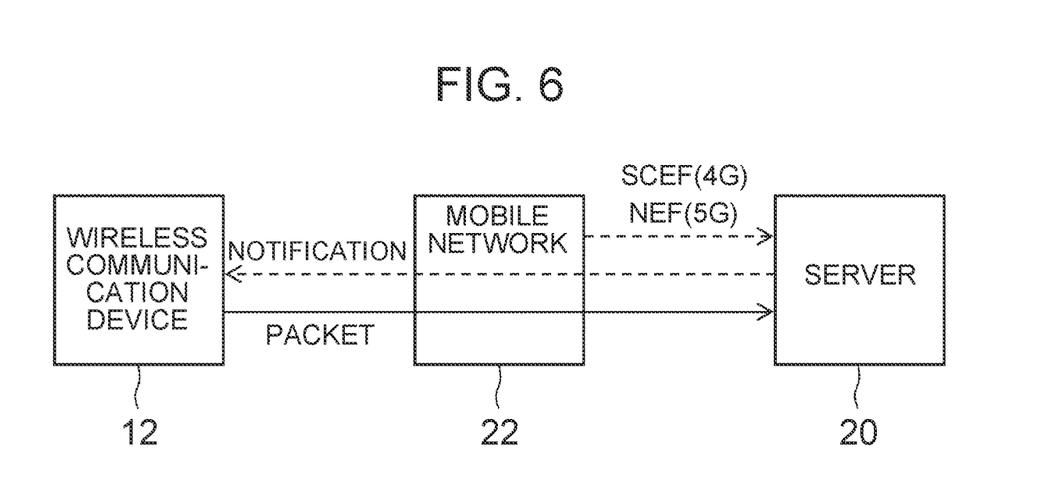
FIG. 6 is a diagram for describing a second scheme for acquiring availability of cellular BDT.

FIG. 6 is a diagram for describing a second scheme for acquiring availability of cellular BDT. In the second scheme, the server 20 acquires information on an area where and a time period of day when cellular BDT is available from the mobile network 22, and notifies the acquired information to the wireless communication device 12. The mobile network 22 notifies the information on the available area and the available time period to the server 20 by using Service Capability Exposure Function (SCEF) in case of 4G, and by using Network Exposure Function (NEF) in case of 5G.

The second scheme has an advantage that standardization is completed by Third Generation Partnership Project (3GPP). In addition, communication redundancy can be reduced, compared to the first scheme.

Third Scheme

Figure 7:
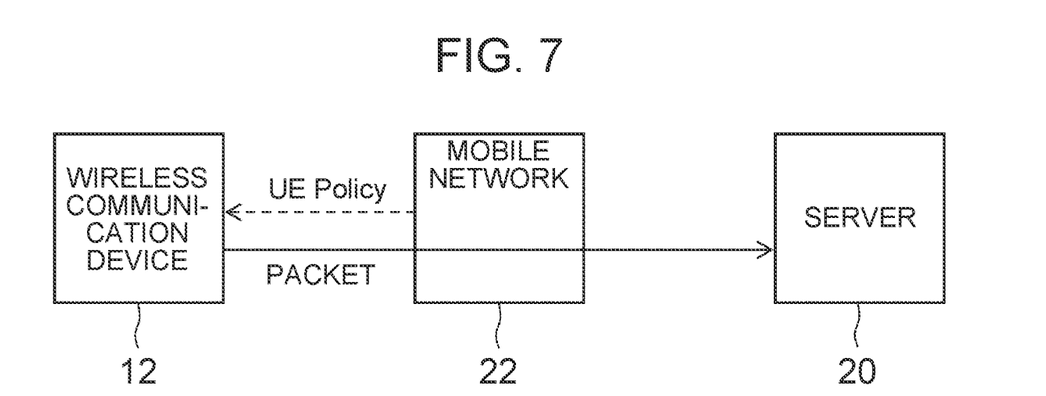
FIG. 7 is a diagram for describing a third scheme for acquiring availability of cellular BDT.

FIG. 7 is a diagram for describing a third scheme for acquiring availability of cellular BDT. In the third scheme, the mobile network 22 directly notifies the wireless communication device 12 of a timing at which cellular BDT is available. For example, the mobile network 22 notifies the available timing by using UE Policy. According to the third scheme, communication redundancy can be reduced, compared to the first and second schemes.

The mobile network 22 includes the data amount acquisition device 26 that acquires, for each APN, an amount of data communicated by the wireless communication device 12. The data amount acquisition device 26 refers to the APN settings information stored on the mobile network 22, acquires information on a data amount counter corresponding to an APN for data transmitted from the wireless communication device 12, and counts an amount of data involved with the APN, based on the data amount counter specified by the information. For example, the data amount acquisition device 26 may be provided to a server (not shown) of a network operator that manages the mobile network 22. Thus, the amount of communicated data, which serves as a base of charge for communication, can be stored for each APN. Since the amount of communicated data can be stored for each APN, a charger of a communication fee can be specified on an APN basis. The charger may be, for example, a vehicle manufacturer, a network operator specified by a user, or the like.

Figure 8:
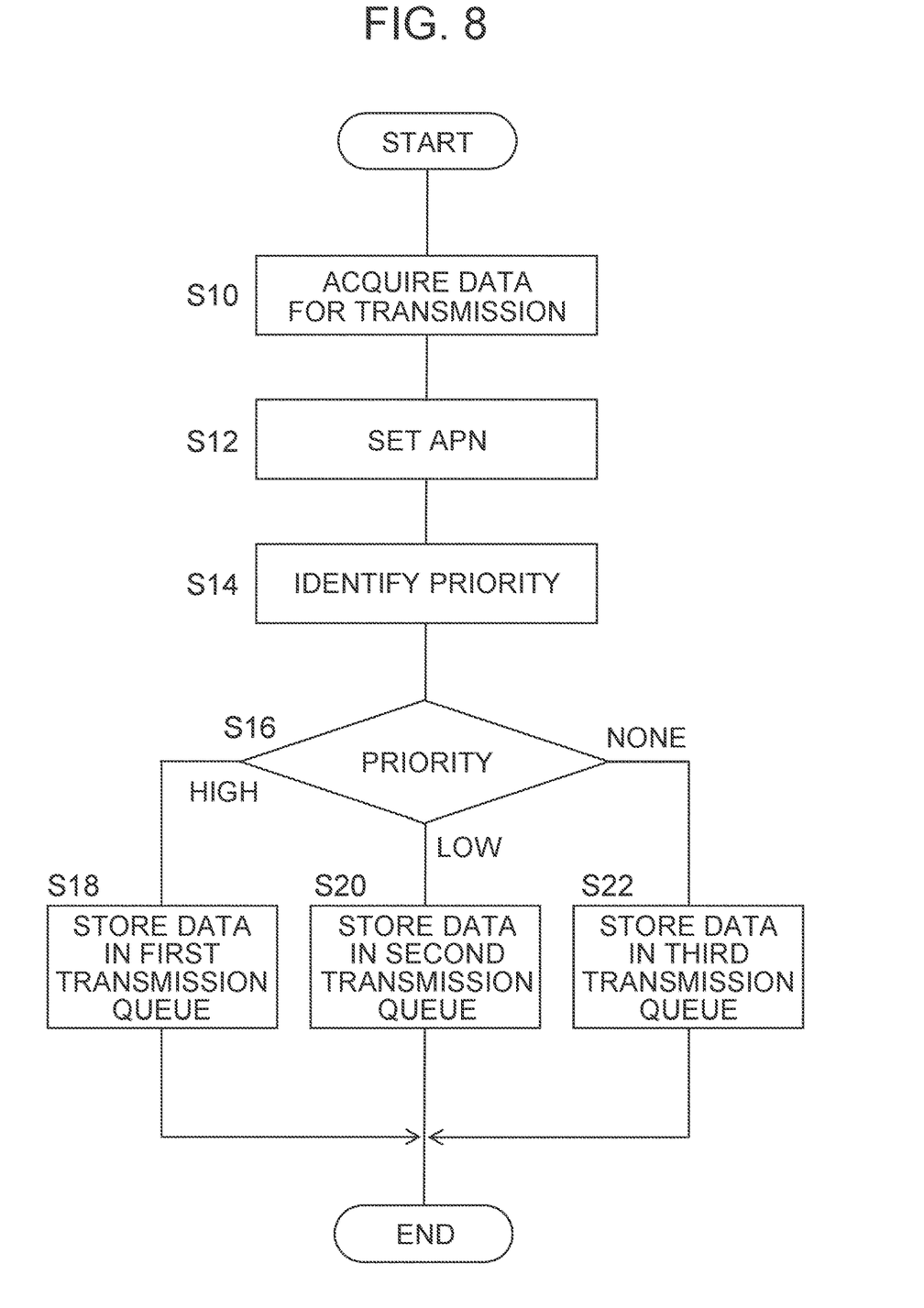
FIG. 8 is a flowchart showing routing control processing by the wireless communication device in FIG. 1.

Next, overall operation of the wireless communication device 12 according to the above-described configuration will be described. FIG. 8 is a flowchart showing routing control processing by the wireless communication device 12 in FIG. 1. The processing in FIG. 8 is repeatedly performed.

The acquisition section 44 acquires data for transmission (S10), and the identification section 50 sets an APN for the data for transmission (S12) and identifies a priority of the data (S14). When the priority is "high" (S16), the transmission control section 52 stores the data in the first transmission queue (S18). When the priority is "low" (S16), the transmission control section 52 stores the data in the second transmission queue (S20). When the priority is "none" (S16), the transmission control section 52 stores the data in the third transmission queue (S22).

Figure 9:
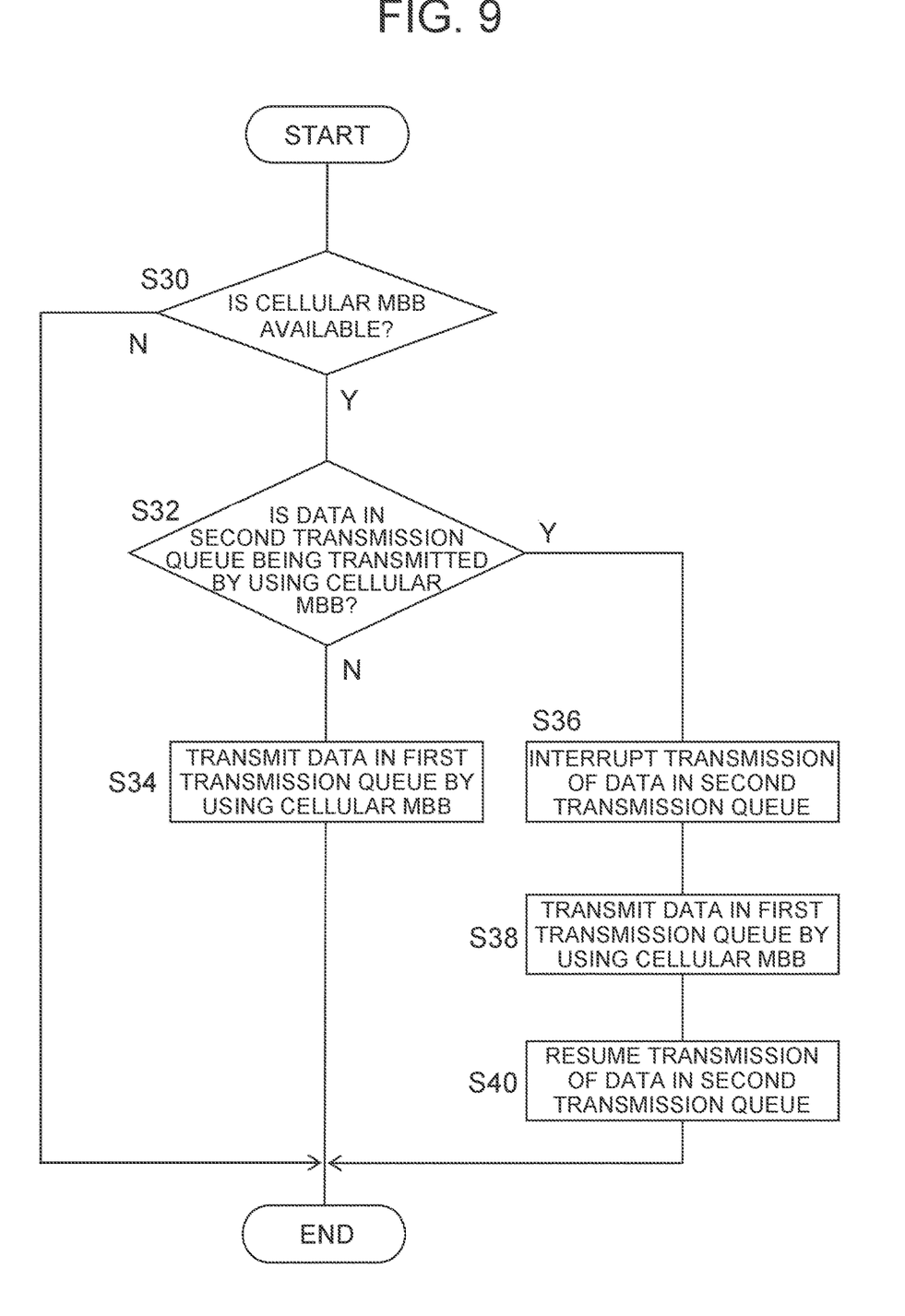
FIG. 9 is a flowchart showing processing of transmitting data in a first transmission queue by the wireless communication device in FIG. 1.

FIG. 9 is a flowchart showing processing of transmitting data in the first transmission queue by the wireless communication device 12 in FIG. 1. The processing in FIG. 9 is performed when data is stored in the first transmission queue.

When cellular MBB is available (Y in S30), and when data in the second transmission queue is not being transmitted by using cellular MBB (N in S32), the transmission control section 52 transmits the data in the first transmission queue by using cellular MBB (S34), and terminates the processing.

When data in the second transmission queue is being transmitted by using cellular MBB (Y in S32), the transmission control section 52 interrupts the transmission of the data in the second transmission queue (S36), transmits the data in the first transmission queue by using cellular MBB (S38), resumes the transmission of the data in the second transmission queue after the transmission of the data in the first transmission queue is finished (S40), and terminates the processing. When cellular MBB is unavailable in S30 (N in S30), the processing is terminated. Note that when cellular MBB is unavailable (N in S30), the processing may return to S30.

Figure 10:
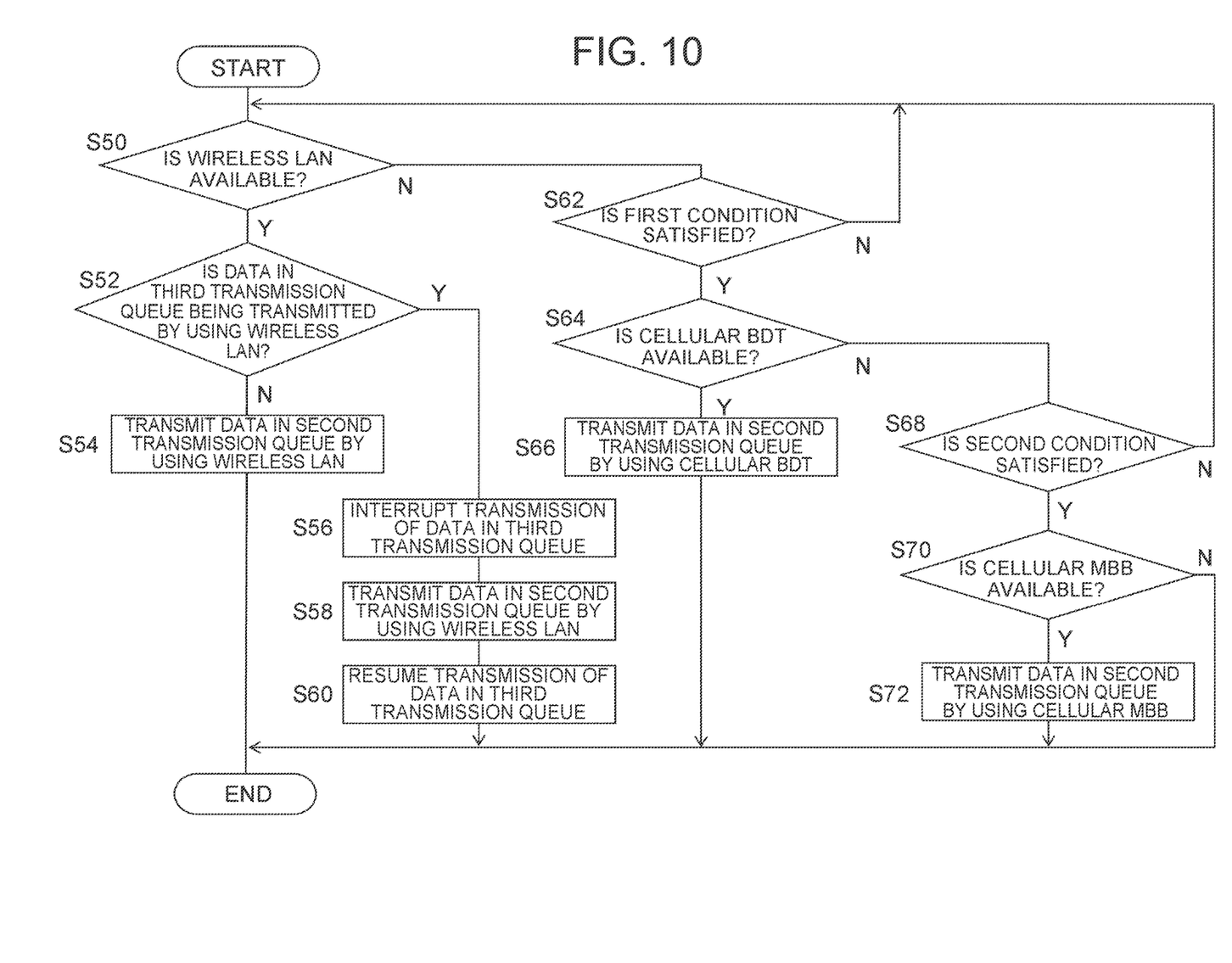
FIG. 10 is a flowchart showing processing of transmitting data in a second transmission queue by the wireless communication device in FIG. 1.

FIG. 10 is a flowchart showing processing of transmitting data in the second transmission queue by the wireless communication device 12 in FIG. 1. The processing in FIG. 10 is performed when data is stored in the second transmission queue.

When a wireless LAN is available (Y in S50), and when data in the third transmission queue is not being transmitted by using wireless LAN (N in S52), the transmission control section 52 transmits the data in the second transmission queue by using wireless LAN (S54), and terminates the processing.

When data in the third transmission queue is being transmitted by using wireless LAN (Y in S52), the transmission control section 52 interrupts the transmission of the data in the third transmission queue (S56), transmits the data in the second transmission queue by using wireless LAN (S58), resumes the transmission of the data in the third transmission queue after the transmission of the data in the second transmission queue is finished (S60), and terminates the processing.

When no wireless LAN is available in S50 (N in S50), when the first condition is satisfied (Y in S62), and when cellular BDT is available (Y in S64), the transmission control section 52 transmits the data in the second transmission queue by using cellular BDT (S66), and terminates the processing. When the first condition is not satisfied (N in S62), the processing returns to S50.

When cellular BDT is unavailable (N in S64), when the second condition is satisfied (Y in S68), and when cellular MBB is available (Y in S70), the transmission control section 52 transmits the data in the second transmission queue by using cellular MBB (S72), and terminates the processing. When the second condition is not satisfied (N in S68), the processing returns to S50. When cellular MBB is unavailable (N in S70), the processing is terminated. Note that when cellular MBB is unavailable (N in S70), the processing may return to S50 or S70.

Figure 11:
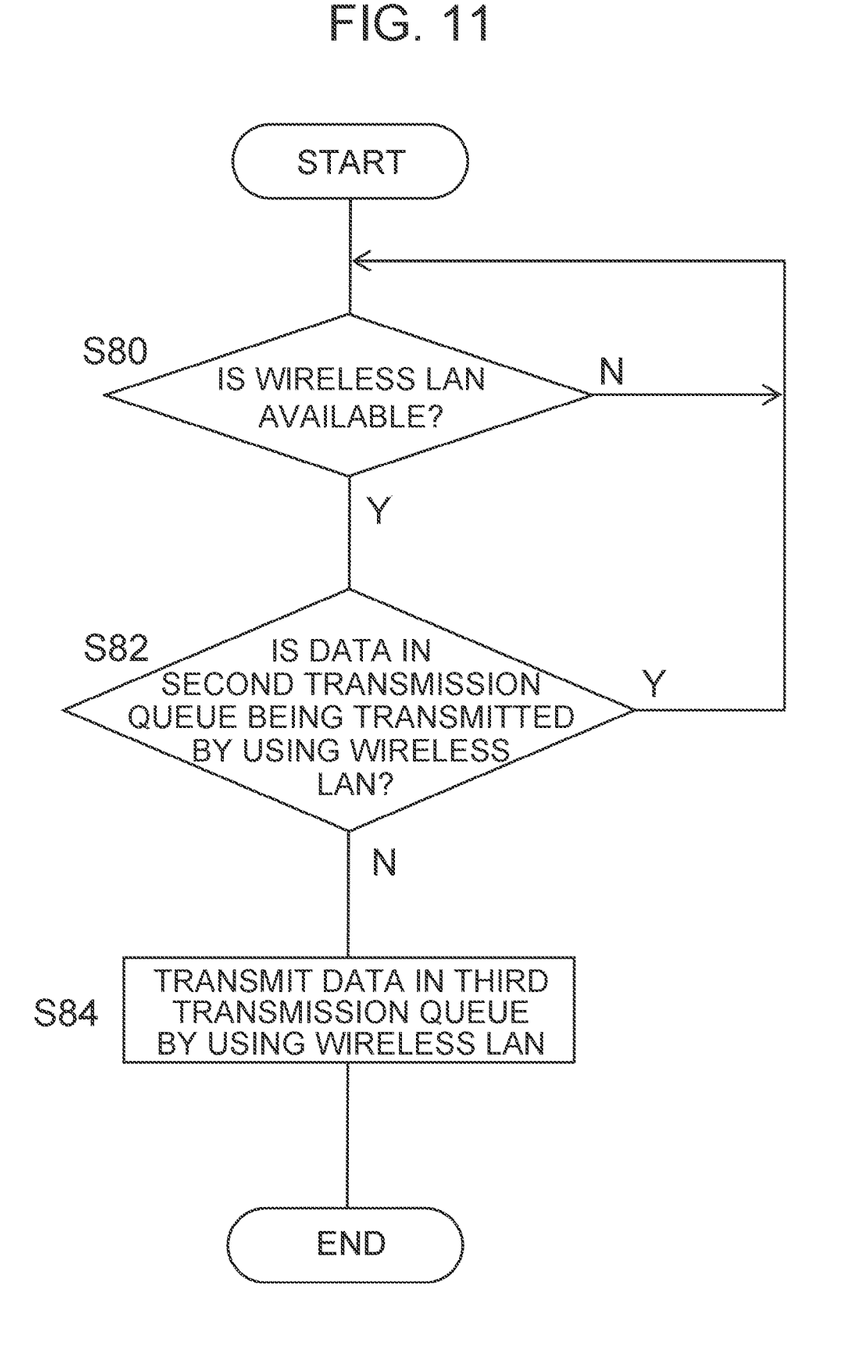
FIG. 11 is a flowchart showing processing of transmitting data in a third transmission queue by the wireless communication device in FIG. 1.

FIG. 11 is a flowchart showing processing of transmitting data in the third transmission queue by the wireless communication device 12 in FIG. 1. The processing in FIG. 11 is performed when data is stored in the third transmission queue.

When a wireless LAN is available (Y in S80), and when data in the second transmission queue is not being transmitted by using wireless LAN (N in S82), the transmission control section 52 transmits the data in the third transmission queue by using wireless LAN (S84), and terminates the processing. When no wireless LAN is available (N in S80), or when data in the second transmission queue is being transmitted by using wireless LAN (Y in S82), the processing returns to S80.

According to the present embodiment, since a priority of data for transmission is identified and a wireless communication service used to transmit the data is determined based on the priority, a wireless communication service with a communication cost and a real-time performance that are suitable for the data for transmission can be determined. Accordingly, communication cost can be reduced while a decrease in service quality can be restrained.

Hereinabove, the disclosure has been described based on the embodiment. The embodiment is presented only for an illustrative purpose, and it can be understood by persons skilled in the art that it is possible to make various modification examples of combinations of each component and each process of processing, and that such modification examples are also incorporated in the scope of the disclosure.

For example, when a specific type of data, of data to be transmitted through the third transmission queue, is not collected even after passage of a predetermined time period, the server 20 may instruct a plurality of wireless communication devices 12 to transmit the specific type of data through the second transmission queue. Since vehicles 90 to which wireless LANs are available are limited, there may be a type of data that cannot be collected. However, according to this modification example, data can be more easily collected.

The first time period in the first condition may be set on each wireless communication device 12, that is, on each vehicle 90. For example, in a situation where a wireless LAN is available in a garage, when there exist a first vehicle that is parked in the garage once a day and a second vehicle that is parked in the garage once every three days, the second vehicle cannot perform transmission by using wireless LAN if the first time period is two days. Accordingly, the first time period may be configured to be made longer than three days for the second vehicle, to allow the second vehicle to perform transmission by using wireless LAN. According to this modification example, data with low priority can be easily transmitted at a lower cost, according to a situation where each vehicle 90 is used.

In the embodiment, the wireless communication device 12 is mounted in the vehicle 90. However, regardless of such a configuration, the wireless communication device 12 may be mounted in a smartphone, a tablet terminal, a mobile telephone, or the like, or may be mounted in a mobile object other than the vehicle, such as a drone.

What is claimed is:

1. A wireless communication device comprising:
   a storage device that stores information indicating a correspondence between an identifier and a priority that are used in data transmission; and
   one or more processors configured to
      acquire data for transmission,
      identify the priority of the data for transmission acquired by the one or more processors, based on the identifier of the data for transmission and the information stored in the storage device,
      determine, based on the priority identified by the one or more processors, a wireless communication service to be used to transmit the data for transmission, among a plurality of wireless communication services that have different communication costs and different real-time performances of transmission, respectively, and
      transmit the data for transmission by using the wireless communication service that is determined, wherein
   the plurality of wireless communication services include a first wireless communication service, a second wireless communication service, and a third wireless communication service;
   the communication cost for the first wireless communication service is higher than the communication cost for the second wireless communication service, and the communication cost for the second wireless communication service is higher than the communication cost for the third wireless communication service;
   the real-time performance of the first wireless communication service is higher than the real-time performance of the second wireless communication service, and the real-time performance of the second wireless communication service is higher than the real-time performance of the third wireless communication service and;
   the one or more processors are configured to
      identify that the priority of the data for transmission is high or low; and
      when the priority of the data for transmission is high, determine the first wireless communication service as the wireless communication service to be used to transmit the data for transmission, and
      when the priority of the data for transmission is low,
         determine the third wireless communication service as the wireless communication service to be used to transmit the data for transmission when the third wireless communication service is available, and
         determine the second wireless service or the first wireless communication service as the wireless communication service to be used to transmit the data for transmission while prioritizing the second wireless communication service, when the third wireless communication service is unavailable.

2. The wireless communication device according to claim 1, wherein the one or more processors are configured to, when the data for transmission with high priority is acquired while data with low priority is being transmitted by using the first wireless communication service, interrupt transmission of the data with low priority until transmission of the data with high priority is finished.

3. The wireless communication device according to claim 1, wherein:
   the one or more processors are configured to identify that the priority of the data for transmission is high, low, or none; and
   the one or more processors are configured to determine the third wireless communication service as the wireless communication service to be used to transmit the data for transmission when the priority of the data for transmission is none.

4. The wireless communication device according to claim 3, wherein the one or more processors are configured to, when the data for transmission with low priority is acquired and when the third wireless communication service is determined as the wireless communication service to be used to transmit the data for transmission while data with no priority is being transmitted by using the third wireless communication service, interrupt transmission of the data with no priority until transmission of the data with low priority is finished.

5. The wireless communication device according to claim 3, wherein the one or more processors are configured to
   store the data for transmission with no priority in a third transmission queue,
   transmit the data for transmission stored in the third transmission queue by using the third wireless communication service, and
   when the third transmission queue is filled to capacity, discard part of the data in the third transmission queue.

6. The wireless communication device according to claim 1, wherein:
   the one or more processors are configured to
      store the data for transmission with high priority in a first transmission queue,
      transmit the data for transmission stored in the first transmission queue by using the first wireless communication service,
      store the data for transmission with low priority in a second transmission queue,
      transmit the data for transmission stored in the second transmission queue by using the first wireless communication service, the second wireless communication service, or the third wireless communication service, and
      when the priority of the data for transmission is low,
         determine the second wireless communication service as the wireless communication service to be used to transmit the data for transmission when the third wireless communication service is unavailable and a predetermined first condition is satisfied, and
         determine the first wireless communication service as the wireless communication service to be used to transmit the data for transmission when the third wireless communication service is unavailable and a predetermined second condition is satisfied;

the predetermined first condition includes at least one of a condition that a duration for which the third wireless communication service is unavailable exceeds a predetermined first time period, or a condition that an amount of data in the second transmission queue exceeds a predetermined first threshold value; and the predetermined second condition includes
at least one of a condition that a duration for which both the second wireless communication service and the third wireless communication service are unavailable exceeds a predetermined second time period, or a condition that the amount of the data in the second transmission queue exceeds a predetermined second threshold value, and a condition that data in the first transmission queue is not being transmitted by using the first wireless communication service.

7. The wireless communication device according to claim 6, wherein the predetermined first time period is shorter than the predetermined second time period, and the predetermined first threshold value is smaller than the predetermined second threshold value.

8. The wireless communication device according to claim 1, wherein:
the first wireless communication service and the second wireless communication service are communication services via a mobile network;
an area where and a time period of day when the second wireless communication service is available are restricted, compared to the first wireless communication service; and
the third wireless communication service is wireless LAN.

9. The wireless communication device according to claim 1, wherein the one or more processors are configured to identify that the priority of the data for transmission is high or low, based on whether a data type of the data for transmission is a predetermined type.

10. A wireless communication system comprising:
a server; and
a wireless communication device configured to perform communication with the server, the wireless communication device including
a storage device that stores information indicating a correspondence between an identifier and a priority that are used in data transmission, and
one or more processors configured to
acquire data for transmission,
identify the priority of the data for transmission acquired by the one or more processors, based on the identifier of the data for transmission and the information stored in the storage device,
determine, based on the priority identified by the one or more processors, a wireless communication service to be used to transmit the data for transmission, among a plurality of wireless communication services that have different communication costs and different real-time performances of transmission, respectively, and
transmit the data for transmission to the server by using the wireless communication service that is determined, wherein the plurality of wireless communication services include a first wireless communication service, a second wireless communication service, and a third wireless communication service;

the communication cost for the first wireless communication service is higher than the communication cost for the second wireless communication service, and the communication cost for the second wireless communication service is higher than the communication cost for the third wireless communication service;

the real-time performance of the first wireless communication service is higher than the real-time performance of the second wireless communication service, and the real-time performance of the second wireless communication service is higher than the real-time performance of the third wireless communication service and;

the one or more processors are configured to
identify that the priority of the data for transmission is high or low; and
when the priority of the data for transmission is high, determine the first wireless communication service as the wireless communication service to be used to transmit the data for transmission, and
when the priority of the data for transmission is low, determine the third wireless communication service as the wireless communication service to be used to transmit the data for transmission when the third wireless communication service is available, and
determine the second wireless communication service or the first wireless communication service as the wireless communication service to be used to transmit the data for transmission while prioritizing the second wireless communication service, when the third wireless communication service is unavailable.

11. The wireless communication system according to claim 10, wherein:
the server transmits the information indicating the correspondence between the identifier and the priority to the wireless communication device; and
the information indicating the correspondence between the identifier and the priority received by the wireless communication device is stored in the storage device.

12. The wireless communication system according to claim 10, wherein:
the plurality of wireless communication services include a wireless communication service via a mobile network;
the information indicating the correspondence between the identifier and the priority includes information indicating a correspondence between the identifier and an access point name (APN);
the one or more processors are configured to set the APN for the data for transmission, based on the information indicating the correspondence between the identifier and the APN; and
the mobile network includes a data amount acquisition device that acquires, for each APN, an amount of data communicated between the mobile network and the wireless communication device.

13. A wireless communication method for a wireless communication device including a storage device that stores information indicating a correspondence between an identifier and a priority that are used in data transmission, the wireless communication method comprising:
acquiring data for transmission;

identifying a priority of the data for transmission that is acquired, based on an identifier of the data for transmission and the information stored in the storage device;

determining, based on the priority that is identified, a wireless communication service to be used to transmit the data for transmission, among a plurality of wireless communication services that have different communication costs and different real-time performances of transmission, respectively; and transmitting the data for transmission by using the wireless communication service that is determined, wherein the plurality of wireless communication services include a first wireless communication service, a second wireless communication service, and a third wireless communication service;

the communication cost for the first wireless communication service is higher than the communication cost for the second wireless communication service, and the communication cost for the second wireless communication service is higher than the communication cost for the third wireless communication service;

the real-time performance of the first wireless communication service is higher than the real-time performance of the second wireless communication service, and the real-time performance of the second wireless communication service is higher than the real-time performance of the third wireless communication service;

the method further includes, identifying that the priority of the data for transmission is high or low; and when the priority of the data for transmission is high, determining the first wireless communication service as the wireless communication service to be used to transmit the data for transmission, and when the priority of the data for transmission is low, determining the third wireless communication service as the wireless communication service to be used to transmit the data for transmission when the third wireless communication service is available, and determining the second wireless communication service or the first wireless communication service as the wireless communication service to be used to transmit the data for transmission while prioritizing the second wireless communication service, when the third wireless communication service is unavailable.

* * * * *